(12) United States Patent
Sasaki et al.

(10) Patent No.: US 8,197,987 B2
(45) Date of Patent: Jun. 12, 2012

(54) SEPARATOR FOR FUEL CELL

(75) Inventors: Hironori Sasaki, Hitachi (JP); Kenji Yamaga, Hitachi (JP); Katsunori Nishimura, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 1207 days.

(21) Appl. No.: 11/626,881

(22) Filed: Jan. 25, 2007

(65) Prior Publication Data

US 2008/0081242 A1   Apr. 3, 2008

(30) Foreign Application Priority Data

Sep. 29, 2006   (JP) .................................. 2006-266247

(51) Int. Cl.
*H01M 8/04* (2006.01)

(52) U.S. Cl. ....................................................... 429/514

(58) Field of Classification Search ..................... 429/38, 429/39
See application file for complete search history.

(56) References Cited

U.S. PATENT DOCUMENTS

| 6,383,678 | B1* | 5/2002 | Kaneko et al. | 429/510 |
| 2004/0157100 | A1* | 8/2004 | Mizuno | 429/26 |
| 2004/0197467 | A1* | 10/2004 | Nakata et al. | 427/123 |
| 2005/0123816 | A1* | 6/2005 | Gao et al. | 429/30 |
| 2005/0271909 | A1* | 12/2005 | Bai et al. | 429/13 |
| 2006/0216572 | A1* | 9/2006 | Yoshida et al. | 429/38 |

FOREIGN PATENT DOCUMENTS

JP   2005-166576   6/2005

* cited by examiner

*Primary Examiner* — Patrick Ryan
*Assistant Examiner* — Muhammad Siddiquee
(74) *Attorney, Agent, or Firm* — Antonelli, Terry, Stout & Kraus, LLP.

(57) ABSTRACT

A separator for fuel cell comprising an electrolyte with ionic conductivity, a pair of electrodes with the electrolyte sandwiched therebetween, and a separator 10 for individually supplying a fuel gas and an oxidizing agent gas to the pair of the electrodes, respectively, wherein the separator 10 is provided with a multilayered metal sheet with at least the outermost layer thereof, and a corrosion-resistant film covering the whole surface of the metal sheet in order to form a metal separator, and the metal separator is further provided with a reacting gas sealing unit 21, a reacting gas manifold junction unit 22, and a reacting gas rectification unit 23, formed of an elastic body.

8 Claims, 2 Drawing Sheets

SEPARATOR FOR FUEL CELL

CLAIM OF PRIORITY

The present application claims priority from Japanese application serial No. 2006-266247, filed on Sep. 29, 2006, the contents of which is hereby incorporated by reference into this application.

BACKGROUND OF THE INVENTION

1. Field of the Invention

The present invention relates to a fuel cell, especially a separator for fuel cell.

2. Prior Art

A conventional PEFC (Polymer Electrolytic Fuel Cell) has a main feature in that it comprises a polymer membrane solid electrolyte, and carbon electrodes each carrying a catalyst such as platinum, and so on. The polymer electrolytic fuel cell is structured such that the carbon electrode is sandwiched between a pair of separators, the respective separators for forming flow channels for hydrogen gas as fuel, and an oxidizing agent gas (oxygen or air, and so on), respectively, and functioning as a current collector. This is called a single cell, and a fuel cell stack is made up by stacking the plural single cells one on top of another.

The separators among those constituent members are a member for efficiently supplying a reacting gas to the respective electrodes, and is made of a carbon-based or metal-based conductive material. In this case, the reacting gas is a generic term referring to a fuel gas as well as the oxidizing agent gas.

Besides, the separator is classified into several types depending on difference in the structure of a face thereof, in contact with the respective electrodes or a diffusion layer. There are available, for example, a separator whose face in contact with the electrode (diffusion layer) is uneven, and a separator made up by combining a flat sheet with an interconnector having a face in uneven shape, or a groove-like shape. The constituent material of the separator can be broadly classified into the carbon-based conductive material, and the metal-based conductive material. Widespread use of the metal-based conductive material is under study because it is low in material cost, and excellent in mass productivity. Further, since use is made of a thin metal sheet in this case, use of the metal-based conductive material has a merit in that a separator can be fabricated so as to be compact in size, and lighter in weight.

A carbon-based separator, in the main, and so on are relatively superior in formability for forming a manifold, and a flow channel groove, and have been adaptable to material having a thickness not less than on the order of 1 to 2 mm. In the case of a separator fabricated out of the thin metal sheet by press working, however, it has been difficult to apply the conventional technology thereto.

Further, a function required of the separator is to efficiently supply the reacting gas to the electrodes. If the constituent material of the separator is carbon-based, it is possible form flow channels in an optional shape, so that an efficient separator can be obtained with ease, however, if the constituent material of the separator is metal-based, flexibility in formability is low as compared with the case of the constituent material being carbon-based because of limitations of plastic working applied to metal. With a separator made of a graphite material, it is possible to form a serpentine structure (winding flow channel; a structure for enabling a flow rate of the reacting gas to increase, thereby evenly supplying the reacting gas to the face of the electrode) on both sides of one sheet of the separator. Meanwhile, in the case where an attempt is made to form an internal manifold type separator as a metal separator for the fuel cell out of a thin metal sheet, the thin metal sheet is worked on such that flow channel grooves, projections, and so on are formed at the central part of the thin metal sheet, and the periphery thereof, respectively, to form pseudo-serpentine flow channels, thereby shaping flow channels for altering a flow direction of the reacting gas.

Patent document 1: Japanese Patent Application Laid-open Publication No. 2005-166576

SUMMARY OF THE INVENTION

In the case where such a pseudo-serpentine structure as described is assumed, however, if the metal press working is applied to the thin metal sheet, this will only form projections oval or rectangular in shape at adequate intervals at reacting gas rectification units to be formed on the periphery of the thin metal sheet. Assuming that press working is applied in the longitudinal direction of, and the transverse direction of the thin metal sheet in order to form uniform flow channels for the reacting gas, cracks are prone to occur thereto because a rolled face formed by the press working does not become uniform, so that it will be difficult to form an optional flow channel structure.

Further, in the case of forming the pseudo-serpentine flow channel with a makeup as simple as possible by combining ovals with rectangles at the reacting gas rectification units, when the reacting gas is fed from reacting gas manifold junction units to the central part, which is a power generation face, and the flow direction of the reacting gas flowing from the central part is altered at the reacting gas rectification units to be thereby fed again to the central part, there is a possibility that the flow of the reacting gas becomes uneven. As a current density, in particular, increases, so does a flow rate of the reacting gas, thereby causing distribution of the reacting gas to be prone to become uneven, so that fuel cell performance has been decreased.

The object on the present invention is to provide a separator for fuel cell enable to form uniform flow channels for the reacting gas, which is difficult to form by an ordinary metal press working Accordingly, with the present invention, as an easy method for flow channel designing, optional flow channels are formed by use of an elastic body, such as a rubber material, and so on, in the reacting gas rectification units where the flow direction of the reacting gas is altered, thereby enabling uniform distribution of reacting gas flow rates to be obtained even if the flow rate of the reacting gas increases particularly at the time of a high current density.

The present invention provides a separator for fuel cell comprising an electrolyte with ionic conductivity, a pair of electrodes with the electrolyte sandwiched therebetween, and a separator for individually supplying a fuel gas, and an oxidizing agent gas to the pair of the electrodes, respectively, wherein the separator is provided with a multilayered metal sheet with at least the outermost layer thereof, and a corrosion-resistant film substantially covering the whole surface of the metal sheet in order to form a metal separator, and the metal separator is further provided with a reacting gas sealing units, a reacting gas manifold junction units, and a reacting gas rectification units, formed of an elastic body, respectively.

According to the present invention the reacting gas manifold junction units as well as the reacting gas rectification units of the metal separator for the fuel cell are formed of the elastic body similar to that used in the reacting gas sealing units, respectively, so that it is possible to form uniform flow channels for the reacting gas, which is difficult to form by an ordinary metal press working.

DETAILED DESCRIPTION OF THE INVENTION

Figure 1:
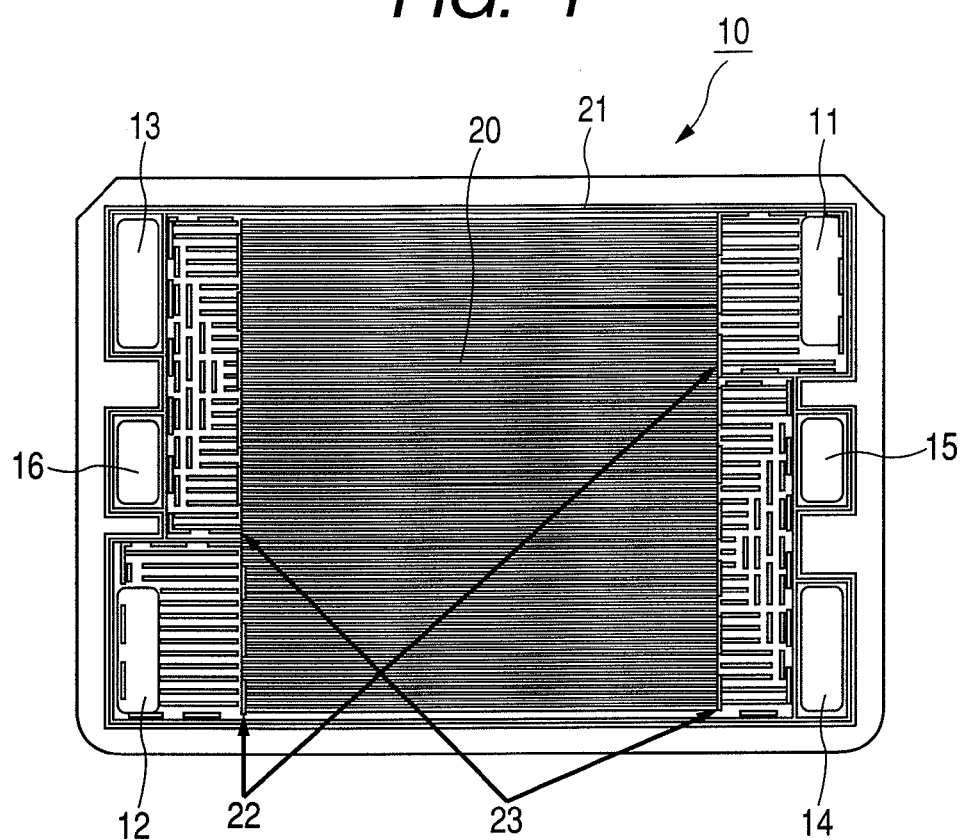
FIG. 1 is a schematic view to show an embodiment of a separator for a polymer electrolytic fuel cell of the present invention.

Embodiments of a separator for a fuel cell, according to the present invention, are described hereinafter.

A separator 10 for a fuel cell, according to the present invention, in a fuel cell having an electrolyte with ionic conductivity, a pair of electrodes with the electrolyte sandwiched therebetween, and the separators for individually supplying a fuel gas, and an oxidizing agent gas to the pair of the electrodes, respectively. The separator 10 for the fuel cell is a metal separator comprising a multilayered metal sheet with at least the outermost layer thereof, made of a corrosion-resistant metal, and a corrosion-resistant film substantially covering the whole surface of the metal sheet. The metal separator 10 is provided with reacting gas sealing units 21, reacting gas manifold junction units 22, and reacting gas rectification units 23, formed of an elastic body, respectively.

The elastic body used in the reacting gas sealing units 21 formed on the metal separator 10 differs in hardness from the elastic bodies used in a reacting gas supply flow channel unit 20, and the reacting gas rectification units 23, formed on the metal separator, respectively, and by rendering the elastic bodies used in the reacting gas supply flow channel unit 20, and the reacting gas rectification units 23, respectively, to be higher in hardness, a cross-sectional area of reacting gas flow channels in the reacting gas supply flow channel unit 20, and the reacting gas rectification units 23, can be sufficiently secured, so that it is possible to reduce loss in pressure of the reacting gas.

By mixing a conductive filler into the respective elastic bodies used in the reacting gas supply flow channel unit 22, and the reacting gas rectification units 23 to thereby provide the reacting gas manifold junction unit 22, and the reacting gas rectification units 23 with conductivity, it is possible to make use of those units as the power generation faces, so that output density of the fuel cell can be enhanced.

Respective gaps between the respective elastic bodies formed in the reacting gas manifold junction units 22 and the reacting gas rectification units 23, formed over the metal separator 10, and projections of the reacting gas supply flow channel unit 20, formed by press working on the power generation face in the central part of the metal separator 10, are formed less than 1.0 mm, thereby preventing the reacting gas from passing through the respective crevices to be discharged out of a fuel cell system before undergoing reaction, resulting in shortage of the reacting gas.

In the embodiment of the present invention, the base material of the elastic body is mainly an elastomer, and the elastic body is formed by, for example, any suitable rubber such as silicone rubber (Q), ethylene-propylene rubber (EPM), ethylene-propylene diene methylene rubber (EPDM), acrylonitrile-butadiene rubber (NBR), and fluorine-containing rubber (FKM), and a mixture thereof, however, EPM or EPDM, excellent in compressibility, and gas blocking properties, is preferably used in the reacting gas sealing units 21.

As the conductive filler mixed into the elastic body, use can be made of any conductive filler such as a metal based filler, a non-metal based filler, a carbon based filler, and so on, however, the carbon based filler with little adverse effects on power generation of the fuel cell is preferably selected.

Specific embodiments of the present invention are described hereinafter with reference to the accompanying drawings.

Embodiment 1

FIG. 1 is a schematic view to show an embodiment of a separator 10 for a polymer electrolytic fuel cell of the present invention. With the separator 10, reacting gas sealing units 21, reacting gas manifold junction units 22, and reacting gas rectification units 23 are formed of an elastic body, respectively, over a pressed metal sheet obtained by press working on a metal sheet so as to form a reacting gas flow channel unit 20 where a reacting gas is supplied to a power generation face.

As shown in the FIG. 1, a fuel gas supply manifold 11 for supplying a fuel gas to a surface of the separator 10, and a fuel gas discharge manifold 12 for discharging the fuel gas out of the separator 10 are formed over the separator 10. Further, there are formed an oxidizing gas supply manifold 13 for supplying an oxidizing agent gas (for example, air, and so on) to the separator 10, an oxidizing gas discharge manifold 14 for discharging the oxidizing agent gas out of the separator 10, a cooling water supply manifold 15, and a cooling water discharge manifold 16, for forming cooling water channels, respectively.

Respective flows of the gases, and the cooling water, over the surface of the separator 10, are not shown in the figure, however, once the fuel cells are piled up to form a fuel cell stack, the fuel cell stack will be structured such that respective flow channels for supplying, and discharging the fuel gas or the oxidizing gas, or supplying, and discharging the cooling water are formed in a direction in which the fuel cells are piled up, thereby supplying the fuel gas or the oxidizing gas to the respective fuel cells within the fuel cell stack while supplying the cooling water to respective cooling units regularly piled up in order to cool down the fuel cell stack.

As shown in the FIG. 1, with the separator 10, the reacting gas sealing unit 21 is formed between the reacting gas manifold junction units 22 as well as between the reacting gas rectification units 23, and the separator 10 is preferably structured such that respective gaps between an edge of each of the reacting gas sealing units 21, and projections of the reacting gas flow channel unit 20, on respective sides thereof, are kept less than 1.0 mm, so that the reacting gas can be prevented from short-cutting.

As shown in the FIG. 1, the fuel gas supplied from the fuel gas supply manifold 11 passes through the reacting gas flow channel unit 20 on the surface of the separator 10, thereby flowing over the separator 10 to the reacting gas rectification units 23 for altering a flow direction of the reacting gas.

Figure 2:
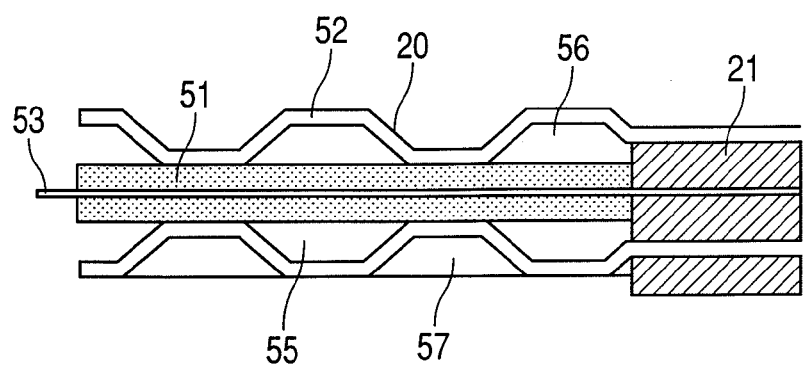
FIG. 2 is a sectional view to show partial structure of an electrolytic fuel cell stack including the separator in the embodiment of the present invention.

And the fuel gas supplied from the fuel gas supply manifold 11 passes through respective depressions of the reacting gas flow channel unit 20 on the surface of the separator 10, flowing to the reacting gas rectification units 23 for altering the flow direction of the reacting gas. With the adoption of a structure wherein a gas diffusion layer 51 is caused to face with the respective projections of the reacting gas flow channel unit 20 on the surface of the separator 10, as shown in FIG. 2, at this point in time, the fuel gas can be supplied throughout the separator 10.

Now, the respective depressions of the reacting gas flow channel unit 20 have plural flow channel grooves each sandwiched between the projections of the reacting gas flow channel unit 20, and the plurality of the flow channel grooves, in a batch, constitute one flow channel groove block.

The reacting gas flows in the same direction within the flow channel groove block, and a flow direction of the reacting gas is turned around at respective reacting gas turn-around flow channel parts.

The reacting gas rectification units 23 each are formed by combining the elastic bodies rectangular in shape with the elastic bodies square in shape.

Even if the flow rate of the reacting gas increase as a result of an increase in a current density, it is possible to keep the flow rate of the fuel gas uniform to be turned around the fuel gas by the action of the respective reacting gas rectification units 23.

FIG. 2 is a sectional view of the fuel cell actually manufactured, and in the case where an MEA (Membrane Electrode Assembly) 53 is disposed on the surface of the separator 10, oxidizing agent gas paths 55 where the oxidizing agent gas flows are disposed at a face opposed to fuel gas paths 56 with the MEA 53 interposed therebetween, and the oxidizing agent gas is guided into the oxidizing agent gas paths 56 from the oxidizing gas supply manifold 13, as shown in FIG. 1, passing through reacting gas flow channels as with the case of the separator 10 before being discharged out of the oxidizing gas discharge manifold 14.

The fuel gas paths 56 each indicate a path for supplying the fuel gas to the MEA 53 via the gas diffusion layer 51. Accordingly, reacting gas paths on a side of the MEA 53, opposite from the fuel gas paths 56, are the oxidizing agent gas paths 55. Further, paths where cooling water as supplied in order to keep the fuel cell at an adequate temperature flows are cooling water paths 57, and if the cooling water paths 57 are disposed such that the cooling water flows over surfaces thereof, opposite to each other, with respective separator substrates 52 of the fuel gas paths 56, and the oxidizing agent gas paths 55, interposed therebetween, this will enable temperature inside the fuel cell to be kept at a constant level.

The respective elastic bodies of the reacting gas sealing units 21, the reacting gas manifold junction units 22, and the reacting gas rectification units 23 have a height in a direction perpendicular to the surface of the separator 10, in as-uncompressed state, which is shown as follows;

elastic body height of the reacting gas sealing units 21 ≧ elastic body height of the reacting gas manifold junction units 22 = elastic body height of the reacting gas rectification units 23

The respective elastic bodies used in the reacting gas manifold junction units 22, and the reacting gas rectification units 23, formed on the separator 10, are rendered higher in hardness than the elastic body used in the reacting gas sealing units 21, thereby reducing volumes of the respective elastic bodies used in the reacting gas manifold junction units 22, and the reacting gas rectification units 23, so that the cross-sectional area of the reacting gas flow channels can be increased, and consequently, the loss in the pressure of the reacting gas can be reduced.

The cross-sectional area of the reacting gas flow channels refers to the sum of the cross-sectional areas of the respective flow channel grooves immediately before the fuel gas supplied from the fuel gas supply manifold 11, as shown in, for example, FIG. 1, flows to the reacting gas turn-around flow channel parts after passing through the one flow channel groove block having the plurality of the flow channel grooves.

By mixing a conductive filler, such as a carbon filler, and so on, into the elastic bodies used in the reacting gas manifold junction units 22, and the reacting gas rectification units 23, formed over the separator 10, respectively, to thereby provide those units with conductivity, a power generation area can be increased, which can contributes to a higher output density of the fuel cell.

There is no particular limitation to a method for forming the elastic bodies, however, it is preferable to use a screen printing method whereby the elastic bodies can be easily formed up to around 1.0 mm away from a pressed portion of the separator, at the central part thereof.

With the separator according to the present embodiment, having the plural reacting gas flow channels for shaping flows of the reacting gas, faced with the electrodes, and independent from each other, as shown in FIG. 1, the flows of the reacting gas can be restrained when the reacting gas is turned around at the respective reacting gas rectification units 23 because the reacting gas flow channels in the respective reacting gas rectification units 23 are formed with the elastic body, so that it is possible to keep the flow rate of the reacting gas uniform, thereby enabling the reacting gas to be evenly fed into MEA electrode faces.

With the present embodiment, since the elastic bodies are formed integrally with the separator 10, respective positions of the projections of the reacting gas flow channel unit 20, respective positions of the reacting gas manifold junction units 22, and the reacting gas rectification units 23, being present on extension of the projections, and respective positions of the edges of the respective reacting gas sealing units 21 that are formed between the reacting gas manifold junction units 22 as well as between the reacting gas rectification units 23 are fixed to predetermined positions in contrast to the case of a separator where a separator substrate 52 is separated from a reacting gas flow channel sheet. Accordingly, when the fuel cell is manufactured with the use of the separator 10 according to the present embodiment, there is no possibility that the flow of the reacting gas is interfered with.

Further, the elastic body differing in kind from the elastic body used in the reacting gas sealing units 21 is used in the reacting gas manifold junction units 22, and the reacting gas rectification units 23, respectively, and if the elastic body higher in hardness is used in the reacting gas manifold junction units 22, and the reacting gas rectification units 23, the volume of the elastic body to be used can be reduced, so that the cross-sectional area of the reacting gas flow channels can be increased, rendering it possible to achieve a lower pressure loss. Further, by mixing the conductive filler into the elastic body to be used, the power generation area can be increased, so that it is possible to provide the fuel cell with a higher output density.

Embodiment 2

In an electrolytic fuel cell stack including the separator in the another embodiment of the present invention, in order to conduct a power generation test using the separator described, GORE SELECT III PRIMEA 5561 (manufactured by Japan Goretex Co., Ltd.) was used for an MEA 53, and CARBEL CL (manufactured by Japan Goretex Co., Ltd.) was used for a gas diffusion layer 51. A separator substrate 72 of the separator 10 is made of stainless steel, and is structured such that projections and depressions formed by press working are provided on both sides of the central part thereof. Press dimensions are 116×117 mm, and electrodes of the MEA 53 are fabricated so as to match the press dimensions.

Figure 3:
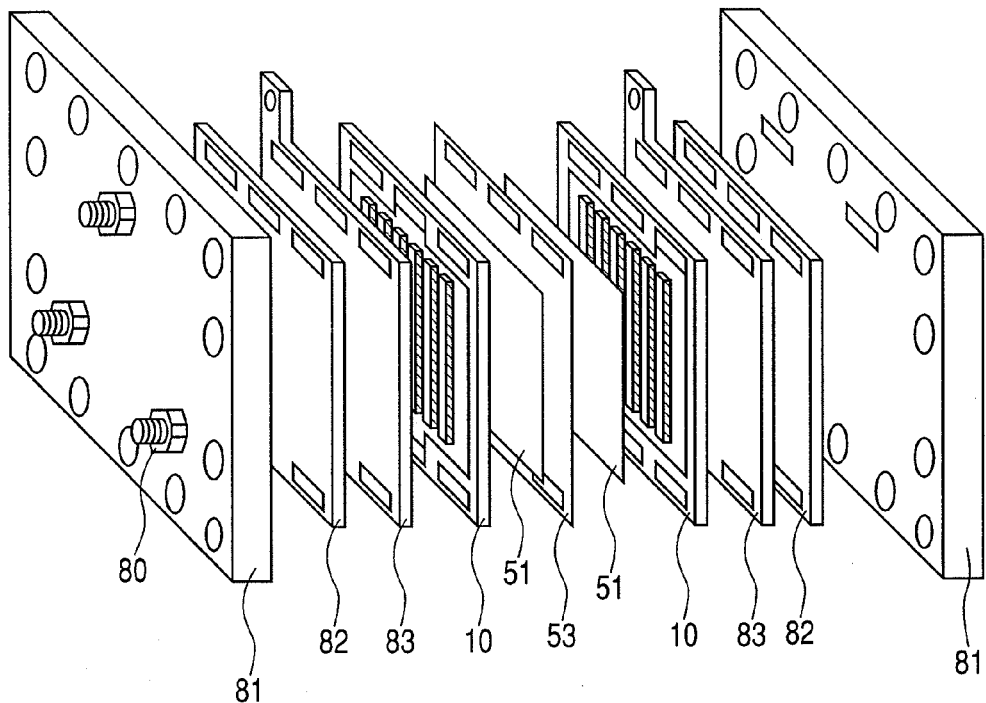
FIG. 3 is an exploded view to show a fuel cell including the separators in the another embodiment of the present invention.

FIG. 3 is an exploded view of a fuel cell including the separators in the another embodiment of the present invention, showing constituent members, and a layout thereof. The MEA 53 is disposed at the center of the fuel cell, and is sandwiched between gas diffusion layers 51 in such a way as to cover electrode portions of the MEA 53. In this case, the gas diffusion layers 51 each have a porous layer for evenly supplying a reacting gas to the electrode portions of the MEA 53. Further, the separators 10 are disposed on respective sides of the MEA 53 in such a way as to embrace the MEA 53, and the gas diffusion layers 51. The fuel cell in this state is called a single cell.

A plastic sheet made of PPS (Poly Phenilen sulfide) 0.25 mm in thickness (not shown) is disposed between the respective separators 10, and the MEA 53 to thereby prevent deformation of the MEA 53.

A current collector sheet 83 is disposed on both sides of the single cell in such a way as to sandwich the single cell between the current collector sheets 83. The current collector sheet 83 refers to a connector from which electric energy actually generated is taken out when power is generated by the fuel cell. For the current collector-sheet 83, use is made of a copper sheet plated with gold. Further, the current collector sheet 83 is provided with through-holes through which the reacting gas, and the cooling water flow.

End plates 81 each are provided with fuel gas feed openings 80, and through-holes for bolts. The respective bolts are inserted into both the end plates 81, and are tightened by use of a spring material such as a coil spring, provided on the end plate 81 on one side of the fuel cell, such that contact pressure is evenly applied to the interior on the whole. Setting is made such that contact pressure at 1 MPa is applied to the MEA 53 at this point in time.

As mechanical strength and so on are required of the end plates 81 and the bolts, metal is used for those. For this reason, short circuit will occur between an anode electrode and a cathode electrode with the single cell as it is, and there is therefore the need for insulation. Accordingly, an insulation plate 82 is disposed between the current collector sheet 83, and the end plate 81, on the respective sides of the fuel cell. In this case, a material having insulating properties must be used for the insulation plate 82, and if a material such as, for example, PTFE, and soon is used, this can ensure insulation between the anode electrode and the cathode electrode.

For prevention of corrosion, and checking growth of an oxidized film, a conductive paint composed of carbon powders, and resin binders is applied to the separator 10 among the constituent members described as above. A method for application of the conductive paint can include various methods such as screen printing, transfer coating, spray coating, and so on, however, in this case, the paint is applied to the respective tops of the projections and depressions, in the pressed part of the separator 10, by the screen printing whereby a film thickness of the paint applied can be easily controlled.

In order to examine fuel cell characteristics by supplying a fuel gas, and an oxidizing agent gas to respective reacting gas feed openings 80 provided on the end plate 81 of the fuel cell made up as described in the foregoing, the fuel cell was connected to an electronic load available in the market to thereby take measurements on a relationship between current and voltage.

After selecting pure hydrogen as the fuel gas, and air as the oxidizing agent gas, power generation was carried out under a condition that the utilization factors of the respective reacting agent gases are at 70% for hydrogen, and at 40% for oxygen while controlling a fuel cell temperature at 70° C., and a dew point of the reacting agent gases at 70° C. The results of the power generation are shown in FIG. 4.

Herein, a conventional structure refers to a structure where projections each in the shape of 1.0 mm square are formed at adequate intervals in the reacting gas rectification units 23 of the separator 10 shown in FIG. 1.

Figure 4:
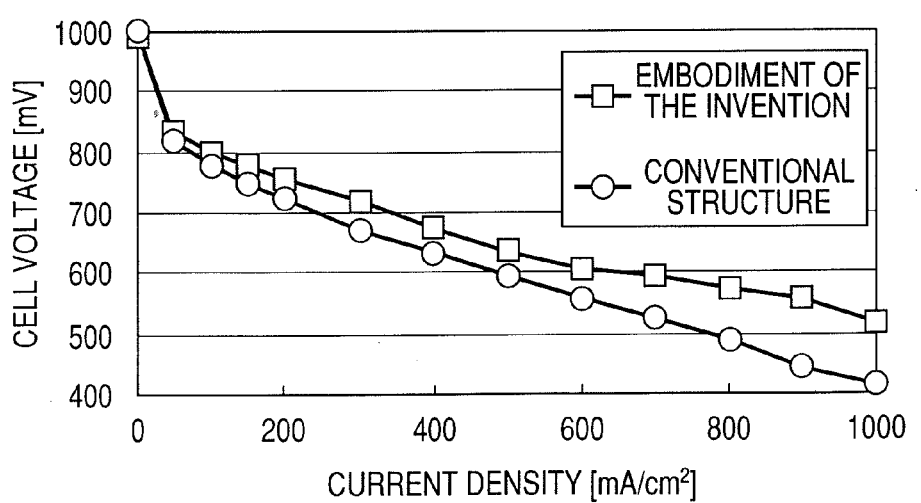
FIG. 4 is a current-voltage characteristics diagram to show results of comparison of the present invention with a conventional structure.

FIG. 4 shows a current-voltage characteristics diagram to show results of comparison of the embodiment of the present invention with a conventional structure. As is evident from FIG. 4, with the structure according to the present embodiment, a cell voltage is found high on the average as compared with the conventional structure, and is on the order of 100 mV higher at 1.0 A/cm$^2$ in particular. The results described prove that installation of the reacting gas rectification units 23 to the separator 10 as with the case of the structure according to the present embodiment has contributed to enhancement in output performance of the fuel cell, thereby confirming superiority of the structure according to the present embodiment.

The separator for a fuel cell of the present invention has been described hereinbefore with reference to the embodiments of the invention; however, it is to be pointed out that the invention be not limited thereto, and that various changes and modifications may be made in the invention without departing from the spirit and scope thereof.

What is claimed is:

1. A separator for a fuel cell, the fuel cell comprising an electrolyte with ionic conductivity, a pair of electrodes with the electrolyte sandwiched therebetween, and the separator for individually supplying a fuel gas and an oxidizing agent gas to the pair of the electrodes, respectively, the separator comprising:
   a multilayered metal sheet with at least an outermost layer, and a corrosion-resistant film covering a whole surface of the metal sheet in order to form a metal separator,
   wherein the metal separator is provided with a reacting gas rectification unit for changing a flow direction of a reacting gas flown from a central part of the metal separator to a periphery thereof and supplying the reacting gas from the periphery of the metal separator to the central part thereof again, a reacting fuel gas manifold, a reacting gas manifold junction unit which is disposed between the reacting fuel gas manifold and the electrodes, and a reacting gas sealing unit, on the periphery of the metal separator respectively, and
   the metal separator is further provided with the reacting gas sealing unit, the reacting gas manifold junction unit, and the reacting gas rectification unit, formed of an elastic body, respectively,
   wherein the elastic body used for the reacting gas sealing unit formed in the metal separator differs in hardness from the respective elastic bodies used for the reacting gas manifold junction unit and the reacting gas rectification unit formed in the metal separator.

2. A separator for a fuel cell, according to claim 1, wherein the reacting gas manifold junction unit, and the reacting gas rectification unit formed in the metal separator, are provided with conductivity by mixing a conductive filler into the respective elastic bodies used therein.

3. A separator for a fuel cell, according to claim 1, wherein gaps between the respective elastic bodies formed for the reacting gas manifold junction unit and the reacting gas rectification unit in the metal separator, and projections of a reacting gas supply flow channel unit formed by press working on the metal separator are formed less than 1.0 mm, respectively.

4. A separator for a fuel cell, according to claim 1, wherein the outermost layer of the multilayered metal sheet is made of a corrosion-resistant metal.

5. A fuel cell using the separator as claimed in claim 1, the fuel cell comprising: the pair of electrodes having the electrolyte sandwiched therebetween, the separator for individually supplying the fuel gas, and the oxidizing agent gas to the pair of the electrodes, respectively.

6. A separator for a fuel cell, according to claim 1, wherein the reacting gas rectification unit is formed only on the periphery of the metal separator.

7. A separator for a fuel cell, according to claim 1, wherein a height of the reacting gas manifold junction unit, in an uncompressed state and in a direction perpendicular to the surface of the separator, is equal to a height of the reacting gas rectification unit, in an uncompressed state and in a direction perpendicular to the surface of the separator.

8. A separator for a fuel cell, according to claim 7, wherein a height of the reacting gas sealing unit, in an uncompressed state and in a direction perpendicular to the surface of the separator, is greater than or equal to the height of the height of the reacting gas manifold junction unit and the height of the reacting gas rectification unit.

* * * * *